US012680582B2

(12) United States Patent
Pillai

(10) Patent No.: US 12,680,582 B2
(45) Date of Patent: Jul. 14, 2026

(54) CLUTCH ENGAGEMENT RATIO DETECTION

(71) Applicant: Robert Bosch GmbH, Stuttgart (DE)

(72) Inventor: Bijith T G Pillai, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/287,245

(22) Filed: Jul. 31, 2025

(65) Prior Publication Data

US 2026/0055793 A1 Feb. 26, 2026

Related U.S. Application Data

(60) Provisional application No. 63/685,493, filed on Aug. 21, 2024.

(51) Int. Cl.
*F16D 48/06* (2006.01)

(52) U.S. Cl.
CPC .... *F16D 48/06* (2013.01); *F16D 2500/30415* (2013.01); *F16D 2500/30426* (2013.01);
(Continued)

(58) Field of Classification Search
CPC ........... F16D 48/06; F16D 2500/30415; F16D 2500/30426; F16D 2500/3067;
(Continued)

(56) References Cited

U.S. PATENT DOCUMENTS

| | | | |
|---|---|---|---|
| 7,957,880 B2 | 6/2011 | Watabe et al. | |
| 8,135,523 B2 * | 3/2012 | Panzer | F16D 48/06 |
| | | | 701/68 |
| 9,243,706 B2 | 1/2016 | Fujii et al. | |
| 9,797,506 B2 | 10/2017 | Pellerito et al. | |

(Continued)

FOREIGN PATENT DOCUMENTS

| | | | | |
|---|---|---|---|---|
| DE | 10238464 A1 | 10/2003 | | |
| EP | 1826439 A1 * | 8/2007 | ........... | F16D 48/064 |

(Continued)

OTHER PUBLICATIONS

International Search Report for Application No. PCT/EP2025/072902 dated Nov. 7, 2025 (4 pages).

*Primary Examiner* — Justin Holmes
(74) *Attorney, Agent, or Firm* — Michael Best & Friedrich LLP

(57) ABSTRACT

A method for determining a clutch engagement ratio for a vehicle having at least a front wheel and a rear wheel, a motor, a transmission, and a clutch coupling the motor to the transmission. The method may include receiving, at a controller, an output transmission speed. The method may include receiving, at the controller, an input transmission speed. The method may include calculating, with the controller, a transmission speed ratio by comparing the output transmission speed to the input transmission speed. The method may include receiving, at the controller, a currently engaged gear in the transmission. The method may include extracting, with the controller, a gear speed ratio associated with the currently engaged gear. The method may compare the transmission speed ratio to the gear speed ratio. The method may extrapolate a clutch engagement ratio. The method may determine a clutch condition.

20 Claims, 3 Drawing Sheets

(52) U.S. Cl.
CPC ............... *F16D 2500/3067* (2013.01); *F16D 2500/30806* (2013.01); *F16D 2500/3109* (2013.01); *F16D 2500/3115* (2013.01); *F16D 2500/70424* (2013.01); *F16D 2500/70426* (2013.01); *F16D 2500/70454* (2013.01); *F16D 2500/7048* (2013.01); *F16D 2500/7049* (2013.01)

(58) Field of Classification Search
CPC ... F16D 2500/30806; F16D 2500/3109; F16D 2500/3115; F16D 2500/70424; F16D 2500/70426; F16D 2500/70454; F16D 2500/7048; F16D 2500/7049
See application file for complete search history.

(56) References Cited

U.S. PATENT DOCUMENTS

| 11,401,987 | B2 | 8/2022 | Guerin et al. |
|---|---|---|---|
| 11,946,538 | B2 | 4/2024 | Stephenson et al. |
| 2006/0219034 | A1 | 10/2006 | Hori et al. |
| 2008/0147288 | A1 | 6/2008 | Reiher et al. |
| 2009/0306869 | A1 | 12/2009 | Wandel |
| 2018/0058519 | A1 | 3/2018 | Bubeck et al. |

FOREIGN PATENT DOCUMENTS

| EP | 1826439 | B1 | 12/2008 | | |
|---|---|---|---|---|---|
| EP | 2112393 | A2 | 10/2009 | | |
| GB | 2389160 | A | 12/2003 | | |
| KR | 20200054386 | A | * | 5/2020 | ............. F16H 59/66 |
| WO | WO-2014156702 | A1 | * | 10/2014 | ........... F02D 41/023 |

* cited by examiner

CLUTCH ENGAGEMENT RATIO DETECTION

FIELD

Clutches are used in the transmissions of motorcycles. Among other things, a clutch engagement ratio detection system for a vehicle with manual transmission is described herein.

SUMMARY

Motorcycles include clutch levers for switching gears during operation. The clutch lever is also used to prevent stalling of the engine, maintain a lower speed, and stop the motorcycle, among other things. An accurate measurement of a clutch engagement ratio provides for a more efficient engine management system (EMS). Accuracy associated with the clutch lever is important to maintain safe operation of the motorcycle. For mechanical transmissions in particular, maintenance of a clutch engagement ratio associated with the clutch lever and durability of the moving parts for the transmission is key to maintaining high performance of the motorcycle and safe driving conditions for an operator.

In some examples, the disclosure herein relates to a method of determining a speed ratio, detecting a gear ratio, comparing the speed ratio to the gear ratio, and extrapolating a clutch engagement ratio.

In some examples, the disclosure herein relates to a motorcycle having a transmission, a clutch, and an output drive shaft, and further comprising a controller configured to determine a speed ratio, detect a gear ratio, compare the speed ratio to the gear ratio, and extrapolate a clutch engagement ratio.

Other aspects, features, examples, and embodiments will become apparent by consideration of the detailed description and accompanying drawings.

DETAILED DESCRIPTION

The EMS for an engine monitors and controls factors such as the fuel, air, and combustion process within the engine. Vehicles with manual transmissions, in particular motorcycles, are typically equipped with only one or two digital clutch switches that provide the EMS with information about the clutch. Typically, the clutch switches indicate either that the clutch lever is pulled 10% or that the clutch lever is pulled 90%. An actual clutch engagement ratio is not provided. The actual clutch engagement ratio can be anywhere between the positions of the digital clutch switches. Knowing the actual clutch engagement ratio enables a plausibility check for the digital clutch switches and for the EMS to operate more efficiently.

Among other things, a system and method for learning and correcting the actual clutch engagement ratio is described herein. Detecting the actual clutch engagement ratio improves torque control and drivability of the motorcycle. Further, for manual transmissions, determining the actual clutch engagement provides information regarding wear and tear of the clutch. By determining the actual clutch engagement ratio, a slipping clutch may be detected. Detection of the slipping clutch enables a reduction in speed and torque which prevents damage to the clutch.

One example system described herein is suitable for vehicles with manual transmissions, in particular a mechanical transmission where the ratio of each gear is known and each gear may be detected by a gear position sensor. Sensors for determining engine speed and transmission output speed may also be part of the system. Generally, the system and method described herein utilize predetermined (e.g., known) and sensed information to determine a speed ratio, detect a gear ratio, compare the speed ratio to the gear ratio, and extrapolate a clutch engagement ratio. A deviation between the speed ratio and the gear ratio may indicate that the clutch is slipping or not fully engaged. Flags may be set to indicate the clutch engagement status, e.g., open clutch, slipping clutch, and closed clutch, or the like. The flags can be used by a main controller for different engine control functions and for providing a plausibility check for the digital clutch switches.

In one aspect, once a clutch slip is detected, the slipping clutch flag activates speed and torque limitation to prevent clutch damage due to friction between a flywheel of the clutch and clutch pads. In one example, a clutch temperature is determined utilizing (or based on) the speed ratio, a torque amount, and the detected clutch engagement ratio.

Figure 1:
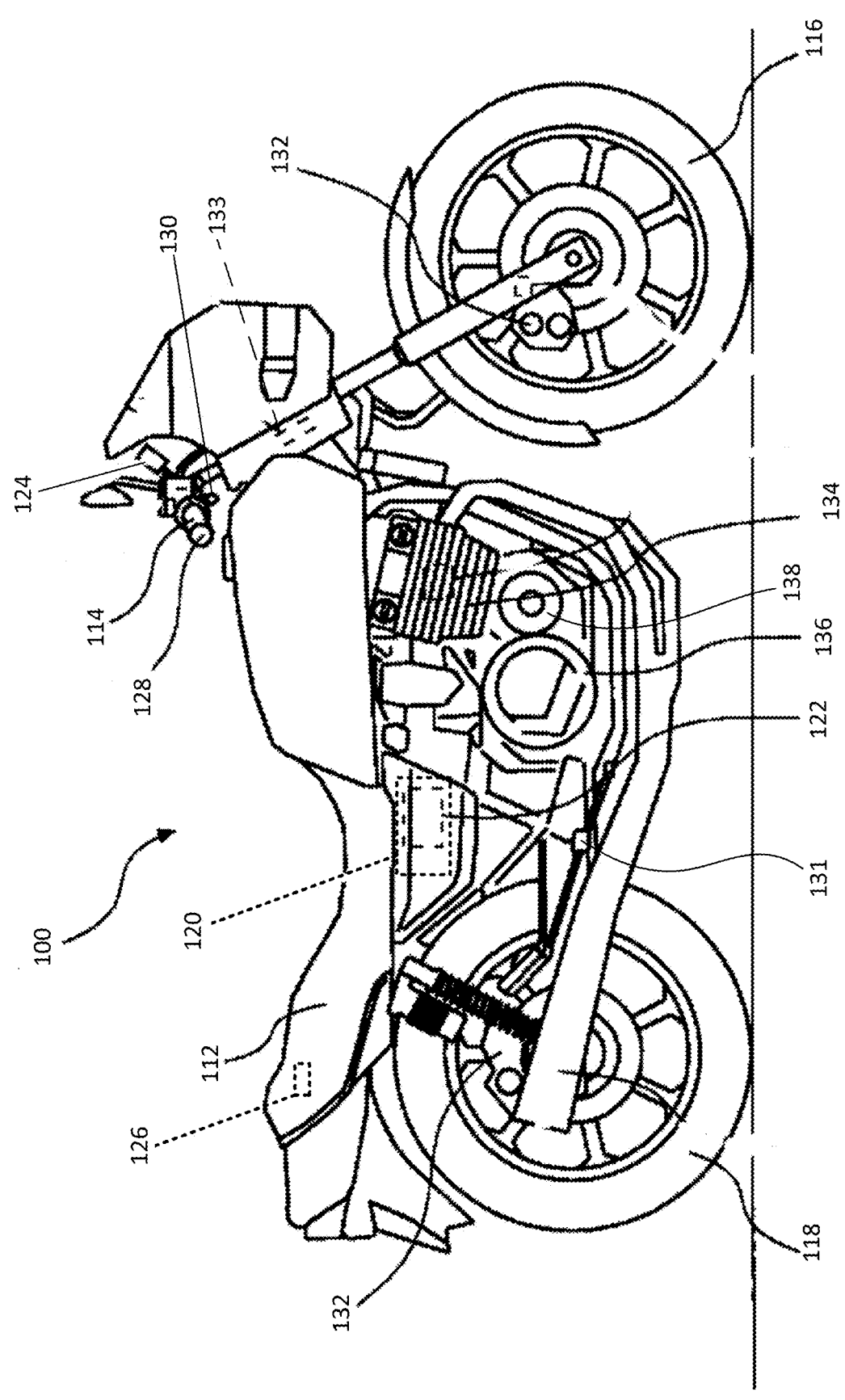
FIG. 1 is a schematic view of an exemplary outline configuration of a motorcycle to which a clutch engagement ratio detection system according to an aspect of the disclosure is mounted.

FIG. 1 is a schematic view of a motorcycle 100, according to one example. In the example shown, the motorcycle 100 includes a body 112, a handlebar 114 mounted to the body 112 in a freely turning manner, a front wheel 116 mounted to the handlebar 114, and a rear wheel 118 mounted to the body 112.

As described herein a clutch engagement ratio detection system 120 may be mounted to the body 112. In one example, the clutch engagement ratio detection system 120 includes a detection controller 122 and a control interface 124. The control interface 124 is be mounted to the handlebar 114 in the example shown. The control interface 124 includes a dedicated main controller 125 separate from the detection controller 122. However, in other instances the detection controller 122 and the main controller 125 are one in the same. While illustrated as separate, both controllers 122, 125 are integral with the control interface 124.

The detection controller 122 and/or the main controller 125 may be provided as a single unit or may be divided into plural units. In addition, the detection controller 122 and/or the main controller 125 may partially or entirely be constructed of a microcomputer, a microprocessor unit, or the like. The detection controller 122 and/or the main controller 125 may be constructed of a member in which, for example, firmware can be updated. Further, in another non-limiting example, the controller is a program module that is executed by a command from a CPU.

In one example, the motorcycle 100 includes an inertial measurement unit (IMU) 126 that includes a three-axis gyroscope sensor and a three-directional acceleration sensor. The motorcycle also includes a plurality of rider controls, for example a throttle grip 128, a clutch lever 130, a gear shifter 131 and/or an accelerator pedal (not shown), and a brake pedal (not shown) operationally connected to a brake 132.

Both the front wheel 116 and the rear wheel 118 may include the brake, it is further contemplated that only one of the front or rear wheels 116, 118 include the brake.

In the example shown, the motorcycle includes a motor 134, e.g., an internal combustion engine, an electric motor, potentially a hybrid combination, or a similar component, and a transmission 136 mechanically coupled to the motor 134 via a clutch 138. The clutch 138 controls an amount of engagement between the motor 134 and the transmission 136. The clutch lever 130 is operationally connected to the clutch 138. A clutch switch 133 is mechanically connected to the clutch lever 130. The clutch switch 133 may indicate an amount of engagement of the clutch 138 with the transmission 136, e.g. 90% equates with little to no engagement and 10% equates with fully engaged. In one example, the transmission 136 includes a set of gears, in one example two to six gears. The transmission is connected to the gear shifter 131. The rear wheel 118 is mechanically connected to the transmission 136. The transmission 136 transmits drive power generated by the motor 134 to the rear wheel 118.

Figure 2:
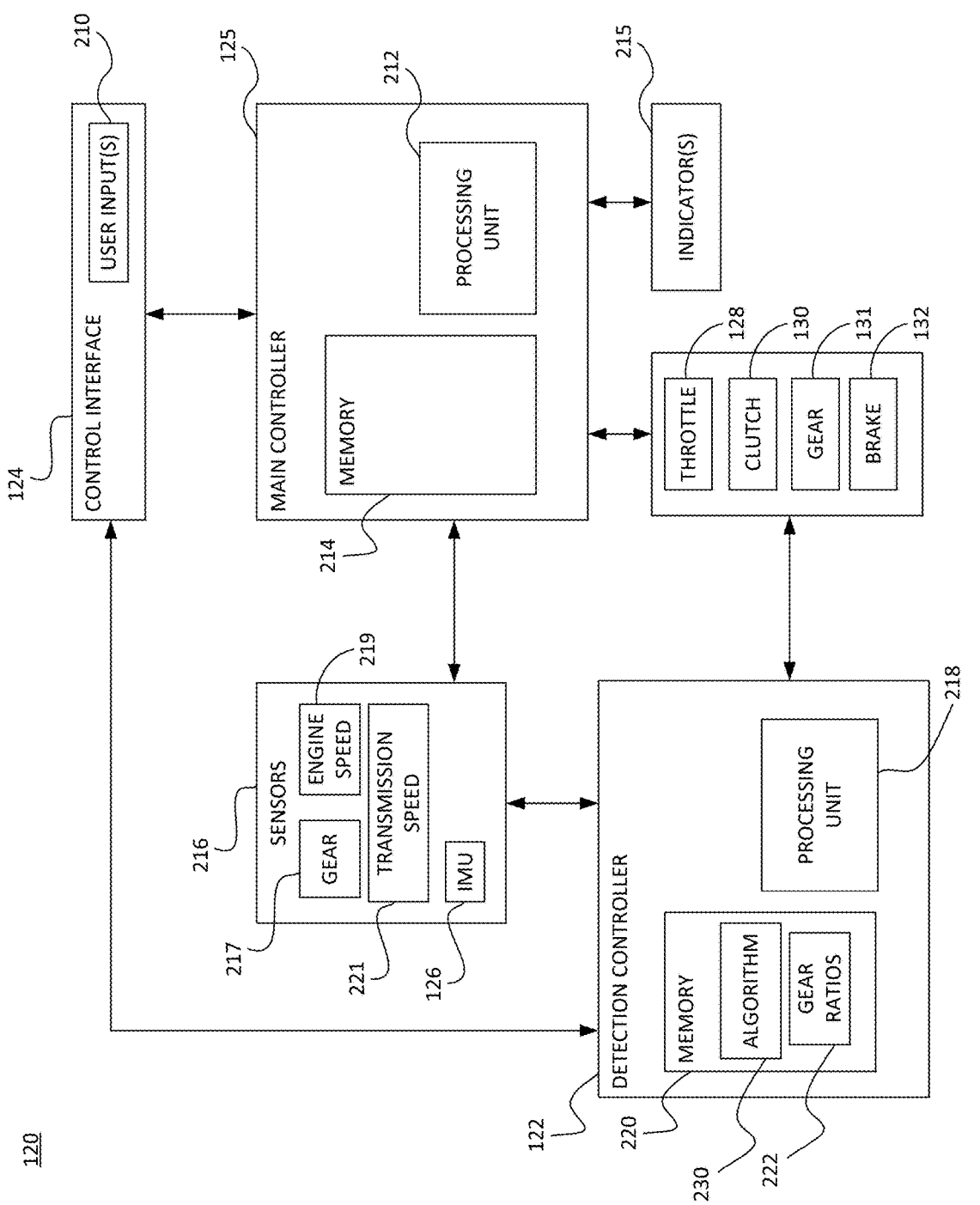
FIG. 2 is a block diagram of the clutch engagement ratio detection system according to some aspects of the disclosure herein.

FIG. 2 is a schematic of the clutch engagement ratio detection system 120. In the example shown, the clutch engagement ratio detection system 120 includes the detection controller 122 and the main controller 125.

The main controller 125 is configured to be connected to various components. In one example, when installed, the main controller is electrically connected to a variety of components of the motorcycle 100. The main controller 125 may be a dedicated controller for controlling, among other things, the behavior of the motorcycle 100. In one instance, the main controller 125 is connected to one or more user inputs 210, one or more indicators 215, one or more rider controls, including the throttle grip 128, the clutch lever 130, and the pedals, and one or more sensors 216, including the IMU 126. Additional sensors, including a gear sensor 217, an engine speed sensor 219, and a transmission output speed sensor 221 may be connected to the main controller 125. The sensors 216 may also include a hall effect sensor, an accelerometer, a radar sensor, a LIDAR sensor, or the like. A connection between the main controller 125 and the control interface 124 may be wireless or wired. In one aspect, the main controller 125 receives wireless inputs from an application running on an external device (e.g., a smartphone, a tablet, a laptop computer, or the like). The main controller 125 may include, among other things, a main processing unit 212 (e.g., a microprocessor, a microcontroller, or another suitable programmable device referred to as an electronic processor) and a main memory 214.

Similar to the main controller 125, the detection controller 122 is also configured to be connected to various components. In one example, when installed, the detection controller 122 is a dedicated controller for the clutch engagement ratio detection system 120. In one instance, the detection controller 122 is electrically connected to the IMU 126, the gear sensor 217, the engine speed sensor 219, and the transmission output speed sensor 221. In one aspect, the detection controller 122 is electrically connected to the clutch lever 130. A detection processing unit 218 (e.g., a microprocessor, a microcontroller, or another suitable programmable device referred to as an electronic processor) and a detection memory 220 are possible components of the detection controller 122. A look-up table for a set of gear ratios 222 can be stored in the detection memory 220. In one example, the detection controller 122 is configured to determine and send a current clutch engagement ratio to the main controller 125.

In some examples, the main processing unit 212 and/or the detection processing unit 218, simply referred to herein as processing units 212, 218, are implemented as a microprocessor with separate memory, for example the main memory 214 and/or the detection memory 220. In other examples, the processing units 212, 218 may be implemented as a microcontroller (with main memory 214 and/or detection memory 220 on the same chip). In other examples, the processing units 212, 218 may be implemented using multiple processors. In addition, the processing units 212, 218 may be implemented partially or entirely as, for example, a field-programmable gate array (FPGA), an applications specific integrated circuit (ASIC), and the like and the main memory 214 and/or detection memory 220 may not be needed or be modified accordingly.

In some examples, the main memory 214 and/or the detection memory, referred to herein as memories 214, 220, include non-transitory, computer-readable memory that stores instructions that are received and executed by the corresponding processing units 212, 218 to carry out method described herein including methods of road surface detection. The memory memories 214, 220 may include, for example, a program storage area and a data storage area. The program storage area and the data storage area may include combinations of different types of memory, for example read-only memory and random-access memory. The control interface 124 may include one or more input mechanisms and one or more output mechanisms (for example, general-purpose input/outputs (GPIOs), a controller area network bus (CAN) bus interface, analog inputs digital inputs, and the like).

In some aspects, software used during operation of the motorcycle 100 is stored within the memories 214, 220. For instance, a clutch engagement algorithm 230, referred to herein as algorithm 230, is stored within the detection memory 220 or in a separate memory location, e.g., the main memory 220. In some examples, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 3:
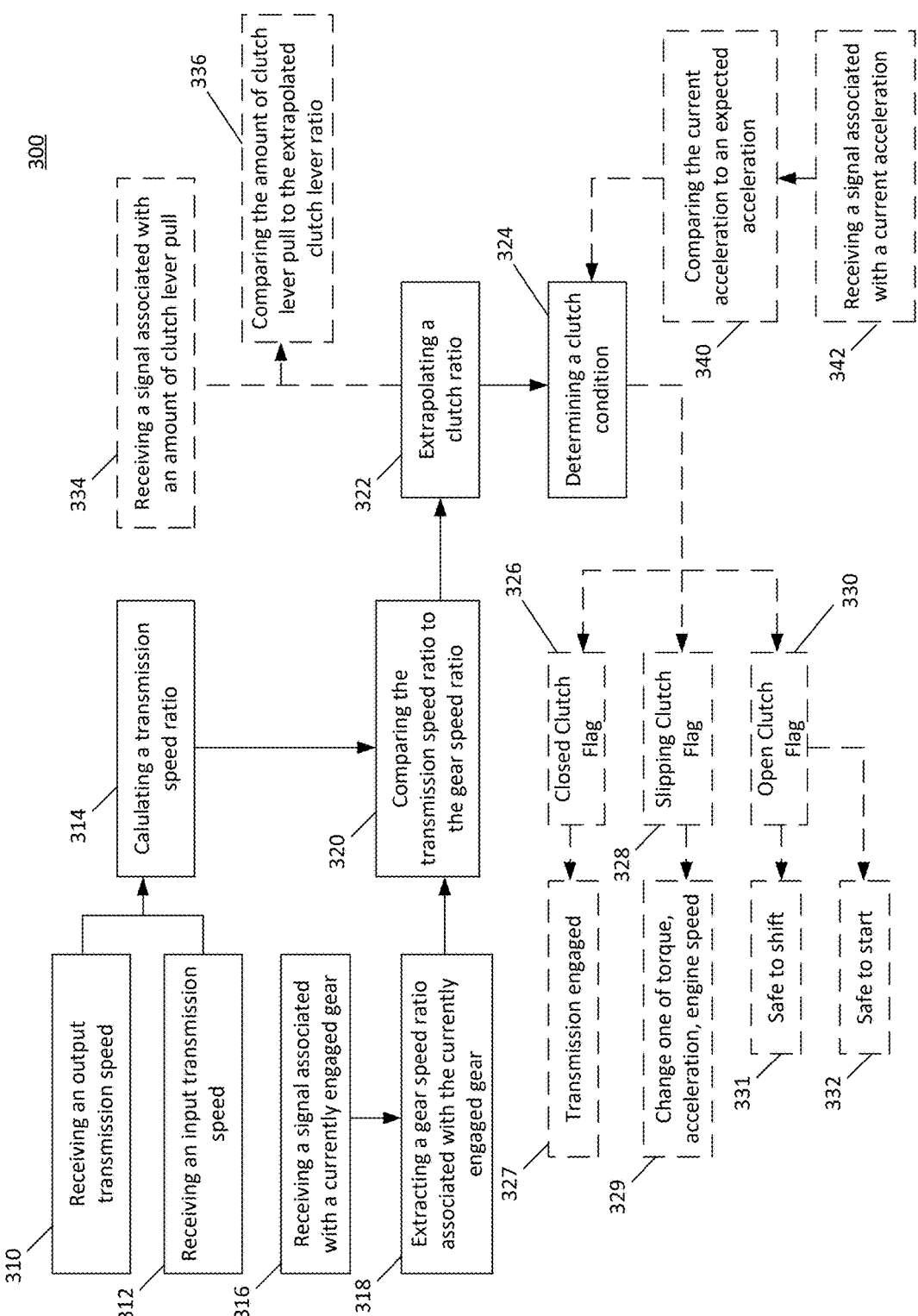
FIG. 3 is a is a flowchart of a method for determining a clutch engagement ratio according to some aspects of the disclosure herein.

FIG. 3 is a flow diagram of an example method 300 for determining an actual clutch engagement ratio using the clutch engagement ratio detection system 120 described herein. The method 300 may be performed by the detection controller 122 or performed by the detection controller 122 and the main controller 125, by implementing the algorithm 230 in at least one step of the method 300.

In the example shown, the method 300 includes, at block 310, receiving a transmission output speed at the detection controller 122. In one example, the transmission output speed sensor 221 is used to detect a speed of the rear wheel 118. The speed of the rear wheel 118 is, in certain instances, a proxy for the transmission output speed.

At block 312, the method 300 includes receiving a transmission input speed at the detection controller 122. In one example, the engine speed sensor 219 is a shaft encoder used to detect the speed of the motor 134 which is, in certain instances, a proxy for the transmission input speed.

At block 314, the method 300 includes calculating a transmission speed ratio by comparing the transmission output speed to the transmission input speed. For example, the transmission input speed may be 1000 RPM and the transmission output speed may be 950 RPM, resulting in a transmission speed ratio of 1.053.

At block 316, the method 300 includes receiving a signal associated with a currently engaged gear. In one example, the gear sensor 217 is used to detect the currently engaged gear.

At block 318, the method 300 includes extracting a gear speed ratio associated with the currently engaged. In one example the gear ratio is extracted from the look-up table including the set of gear ratios 222 stored in the detection memory 220. For example, when a $4^{th}$ gear is engaged, the transmission output speed is 950 RPM and the associated gear speed ratio is 1.053.

At block 320, the method includes comparing the transmission speed ratio to the gear speed ratio. In the above example the ratios match, and the engine is performing as expected.

At block 322, the method includes extrapolating the clutch engagement ratio based on the comparison using the algorithm 230. For example, when the ratios match, the associated clutch engagement ratio is 1, or 100%, the transmission is engaged, and the engine is performing as expected.

In another example, if the transmission speed ratio is different than the gear speed ratio, one of two situations may be occurring, a slipping clutch or an open clutch. In a slipping clutch situation, the transmission is not adequately engaged/disengaged from the motor 134. This will lead to a decrease in power being provided to the rear wheel 118 and in turn a large discrepancy between the gear speed ratio and the transmission speed ratio. A clutch threshold associated with a slipping clutch may be predetermined. For example, a clutch engagement ratio ranging from 0 to 0.5 (0% to 50%) may be associated with a slipping clutch.

In an open clutch situation, the transmission is fully disengaged with the motor 134. This will lead to a small difference between the output transmission speed ratio and the gear speed ratio, when compared to the slipping threshold. A clutch threshold associated with an open clutch may be predetermined. For example, clutch engagement ratios of between 0.5 and 1 (50% and 100%) may be associated with an open clutch.

At block 324, the method includes determining a clutch condition using the extrapolated clutch engagement ratio. For example, a 100% clutch engagement ratio may result in a closed clutch condition. This condition may activate, at block 326, a closed clutch flag. The closed clutch flag may simply be an indicator, e.g. indicator 215, notifying the driver that at block 327 the transmission is engaged.

In another example, a 40% clutch engagement ratio falls in the clutch engagement ratio associated with a slipping clutch. In this example, the method 300 may include activating, at block 328, a slipping clutch flag. The slipping clutch flag may result in a number of actions, including, among other things, at block 329, changing the torque output delivered to the rear wheel 118, engaging the brake 132, and decreasing the engine speed. Further, a clutch temperature may be determined based on the speed ratio, a torque amount, and the detected clutch engagement ratio.

In another example, the method 300 includes receiving, at block 340, a signal associated with a current acceleration. For example, receiving the signal from the IMU 126. At block 342, comparing a current acceleration to an expected acceleration. The comparison is used to determine the clutch condition at block 324. When a reduction in acceleration is detected, this is due to a loss in power to the transmission by a slipping clutch. In this event the method includes, activating, at block 328, the slipping clutch flag. Detecting the current acceleration and comparing it to the expected acceleration provides an additional check and confirmation of the slipping clutch flag for the clutch engagement ratio detection system 120.

In yet another example, an 80% clutch engagement ratio may result in an open clutch condition. In this example, the method 300 may include activating, at block 330, an open clutch flag. The open clutch flag may simply be an indicator, e.g. indicator 215, notifying the driver at block 331 that a safe shift scenario exists and the motorcycle 100 is safe to shift gears or, notifying the driver at block 332, that a safe start scenario exists and the motorcycle 100 is safe to start.

In another example, the method 300 may include, at block 334, receiving a signal associated with an amount of clutch lever pull. The received signal may originate from the clutch switch 133. For example, either 10% or 90%, where 10% is associated with a closed clutch and 90% is associated with an open clutch.

At block 336, the method 300 may include comparing the sensed clutch lever pull to the extrapolated clutch lever ratio to determine an accuracy of the clutch switch. For example, if the 80% clutch engagement ratio is determined a clutch lever pull of 90% should be indicated by the clutch switch.

Accordingly, various implementations of the systems and methods described herein provide, among other things, techniques for detecting a clutch condition for a vehicle, in particular for a motorcycle. Other features and advantages of the disclosure are set forth in the following claims.

In the foregoing specification, specific examples have been described. However, one of ordinary skill in the art appreciates that various modifications and changes may be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims, unless the context explicitly indicates otherwise. The claimed subject matter is defined solely by the appended claims including any amendments made during the pendency of this application and all equivalents of those claims as issued.

In this document relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be noted that a plurality of hardware and software-based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware.

However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software-based devices, as well as a plurality of different structural components may be utilized to implement the invention. For example, "control units" and "controllers" described in the specification can include one or more electronic processors, one or more memories including a non-transitory computer-readable medium, one or more input/output interfaces, and various connections (for example, a system bus) connecting the components.

It should also be understood that although certain drawings illustrate hardware and software located within particular devices, these depictions are for illustrative purposes only.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations collectively. To reiterate, those electronic processors and processing may be distributed.

Implementations of the present disclosure are disclosed in the following clauses:

Clause 1. A method for determining a determining a clutch engagement ratio for a vehicle having at least a front wheel and a rear wheel, a motor, a transmission, and a clutch coupling the motor to the transmission, the method comprising: receiving, at a controller, an output transmission speed; receiving, at the controller, an input transmission speed; calculating, with the controller, a transmission speed ratio by comparing the output transmission speed to the input transmission speed; receiving, at the controller, a signal associated with a currently engaged gear in the transmission; extracting, with the controller, a gear speed ratio associated with the currently engaged gear; comparing the transmission speed ratio to the gear speed ratio; extrapolating a clutch engagement ratio; and determining a clutch condition.

Clause 2. The method of clause 1, wherein receiving the output transmission speed further comprises receiving a signal associated with a sensed speed of a wheel engaged with the transmission.

Clause 3. The method of any preceding clause, wherein receiving the input transmission speed further comprises receiving a signal associated with a detected speed of the motor.

Clause 4. The method of clause 3, wherein the detected speed is detected with a shaft encoder coupled to an output shaft of the motor.

Clause 5. The method of any preceding clause, wherein receiving the currently engaged gear further comprises receiving a signal associated with a sensed engaged gear.

Clause 6. The method of any preceding clause, wherein extracting the gear speed ratio comprises extracting the gear speed ratio from a set of gear ratios stored in a detection memory of the controller.

Clause 7. The method of any preceding clause, wherein determining the clutch condition comprises determining that the transmission speed ratio matches the gear speed ratio, and the transmission is engaged.

Clause 8. The method of clause 7, further comprising activating a closed clutch flag.

Clause 9. The method of any preceding clause, wherein determining the clutch condition comprises determining that the transmission speed ratio differs from the gear speed ratio, and the clutch condition is either a slipping clutch or an open clutch.

Clause 10. The method of clause 9, further comprising determining a clutch engagement ratio threshold.

Clause 11. The method of clause 10, wherein a clutch engagement ratio threshold ranging from 0 to 0.5 is associated with a slipping clutch.

Clause 12. The method of clause 11, wherein the clutch engagement ratio falls within the clutch engagement ratio threshold and a slipping clutch flag is activated.

Clause 13. The method of clause 12, wherein the slipping clutch flag changes an amount of torque output delivered to the rear wheel.

Clause 14. The method of clause 12, wherein the slipping clutch flag engages a brake for the vehicle.

Clause 15. The method of clause 12, wherein the slipping clutch flag decreases a speed of the motor.

Clause 16. The method of clause 10, wherein a clutch engagement ratio threshold ranging from 0.5 to 1 is associated with an open clutch.

Clause 17. The method of clause 16, wherein the clutch engagement ratio falls within the clutch engagement ratio threshold and an open clutch flag is activated.

Clause 18. The method of clause 17, wherein the open clutch flag is an indicator associated with a safe start scenario.

Clause 19. The method of clause 17, wherein the open clutch flag is an indicator associated with a safe shift scenario.

Clause 20. The method of clause 12, further comprising receiving, at the controller, a signal associated with a current acceleration.

Clause 21. The method of clause 20, further comprising comparing the current acceleration to an expected acceleration.

Clause 22. The method of clause 21, further comprising confirming the slipping clutch flag.

Clause 23. The method of any preceding clause, further comprising receiving, at the controller, an amount of clutch lever pull and comparing the amount of clutch lever pull to the clutch engagement ratio.

What is claimed is:

1. A method for determining a clutch engagement ratio for a vehicle having at least a front wheel and a rear wheel, a motor, a transmission, and a clutch coupling the motor to the transmission, the method comprising:

receiving, at a controller, an output transmission speed;

receiving, at the controller, an input transmission speed;

calculating, with the controller, a transmission speed ratio by comparing the output transmission speed to the input transmission speed;

receiving, at the controller, a signal associated with a currently engaged gear in the transmission;

extracting, with the controller, a gear speed ratio associated with the currently engaged gear;

comparing the transmission speed ratio to the gear speed ratio;

extrapolating a clutch engagement ratio from the comparison of the transmission speed ratio to the gear speed ratio; and determining a clutch condition based on the clutch engagement ratio.

2. The method of claim 1, wherein receiving the output transmission speed further comprises receiving a signal associated with a sensed speed of a wheel engaged with the transmission.

3. The method of claim 1, wherein receiving the input transmission speed further comprises receiving a signal from a shaft encoder coupled to an output shaft of the motor associated with a detected speed of the motor.

4. The method of claim 1, wherein extracting the gear speed ratio comprises extracting the gear speed ratio from a set of gear ratios stored in a detection memory of the controller.

5. The method of claim 1, wherein determining the clutch condition comprises determining that the transmission speed ratio matches the gear speed ratio, and the transmission is engaged.

6. The method of claim 5, further comprising activating a closed clutch flag.

7. The method of claim 1, wherein determining the clutch condition comprises determining that the transmission speed ratio differs from the gear speed ratio, and the clutch condition is either a slipping clutch or an open clutch, and activating one of a slipping clutch flag or an open clutch flag based on whether the clutch engagement ratio satisfies a predetermined clutch threshold.

8. The method of claim 7, wherein a clutch engagement ratio ranging from 0 to 0.5 is associated with the slipping clutch flag.

9. The method of claim 7, wherein when the slipping clutch flag is activated, an amount of torque output delivered to the rear wheel changes.

10. The method of claim 7, wherein when the slipping clutch flag is activated, a brake for the vehicle is engaged.

11. The method of claim 7, wherein when the slipping clutch flag is activated a speed of the motor decreases.

12. The method of claim 7, wherein a clutch engagement ratio ranging from 0.5 to 1 is associated with the open clutch flag.

13. The method of claim 7, wherein the open clutch flag is an indicator associated with a safe start scenario.

14. The method of claim 7, wherein the open clutch flag is an indicator associated with a safe shift scenario.

15. The method of claim 7, further comprising receiving, at the controller, a signal associated with a current acceleration and comparing the current acceleration to an expected acceleration.

16. The method of claim 15, further comprising confirming the slipping clutch flag when a reduction in acceleration is detected.

17. The method of claim 1, further comprising receiving, at the controller, an amount of clutch lever pull and comparing the amount of clutch lever pull to the clutch engagement ratio.

18. The method of claim 1, further comprising:

determining a clutch ratio threshold;

activating an open clutch flag when the clutch engagement ratio is between the clutch ratio threshold and 1;

activating a slipping clutch flag when the clutch engagement ratio is greater than 0 and less than or equal to the clutch ratio threshold; and activating a closed clutch flag when the clutch engagement ratio is equal to 1.

19. A method for determining a clutch condition for a vehicle having at least a front wheel and a rear wheel, a motor, a transmission, and a clutch coupling the motor to the transmission, the method comprising:

determining, with a controller, an output transmission speed;

determining, with the controller, an input transmission speed;

determining, with the controller, a transmission speed ratio by comparing the output transmission speed to the input transmission speed;

determining, with the controller, a currently engaged gear in the transmission;

extracting a gear speed ratio associated with the currently engaged gear from a stored set of gear ratios;

determining, with the controller, a clutch engagement ratio by comparing the transmission speed ratio to the gear speed ratio;

determining, with the controller, a clutch condition based on the clutch engagement ratio;

receiving, at the controller, a signal associated with a current acceleration and comparing the current acceleration to an expected acceleration; and confirming, with the controller, the clutch condition based on the comparison of the current acceleration and the expected acceleration.

20. The method of claim 19, further comprising:

determining a clutch ratio threshold;

activating an open clutch flag when the clutch engagement ratio is between the clutch ratio threshold and 1;

activating a slipping clutch flag when the clutch engagement ratio is greater than 0 and less than or equal to the clutch ratio threshold; and activating a closed clutch flag when the clutch engagement ratio is equal to 1.

* * * * *